(No Model.)

H. ALBRECHT.
MACHINE FOR CUTTING MEAT AND OTHER SUBSTANCES.

No. 435,383. Patented Sept. 2, 1890.

Witnesses:
F. Norman Dixon
Lewis Attmaier

Hermann Albrecht.
Inventor
By his Attorneys,

UNITED STATES PATENT OFFICE.

HERMANN ALBRECHT, OF PHILADELPHIA, PENNSYLVANIA.

MACHINE FOR CUTTING MEAT AND OTHER SUBSTANCES.

SPECIFICATION forming part of Letters Patent No. 435,383, dated September 2, 1890.

Application filed May 2, 1890. Serial No. 350,254. (No model.)

*To all whom it may concern:*

Be it known that I, HERMANN ALBRECHT, a citizen of the United States, residing in the city and county of Philadelphia and State of Pennsylvania, have invented certain Improvements in Machines for Cutting Meat and other Substances, of which the following is a specification.

My invention relates to a class of cutting machines in which a rotatable cutter is inclosed in a casing, a part of which is conveniently of conical form and embodies devices such as internal ribs and sharp edged delivery holes, with which the cutter in its rotation co-operates to cut up the substance fed to it.

It is the object of my present invention to provide a machine of the foregoing character which shall be of few parts, capable of ready and satisfactory adjustment and of being taken apart and cleaned with facility, and in which a screw is provided which performs the cutting and also takes the place of the especial feeding devices heretofore usual in such machines.

Figure 1:
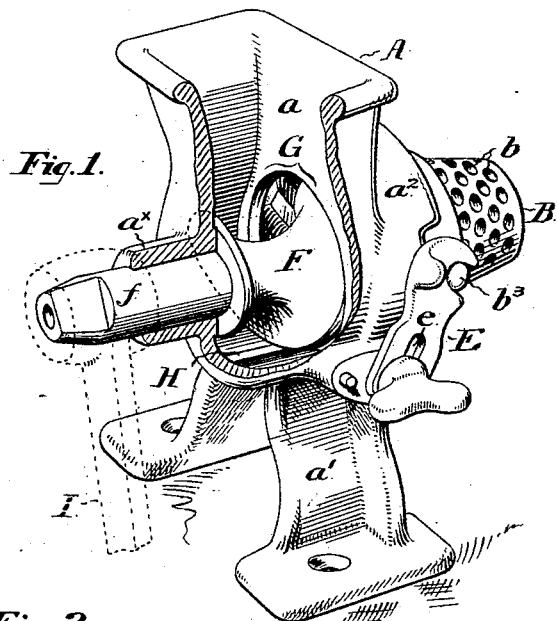
Figure 3:
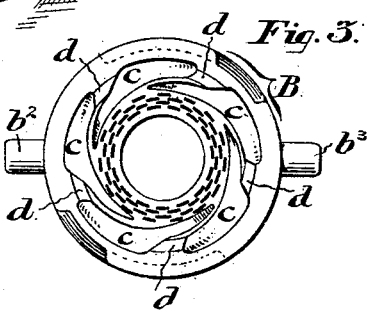
Figure 2:
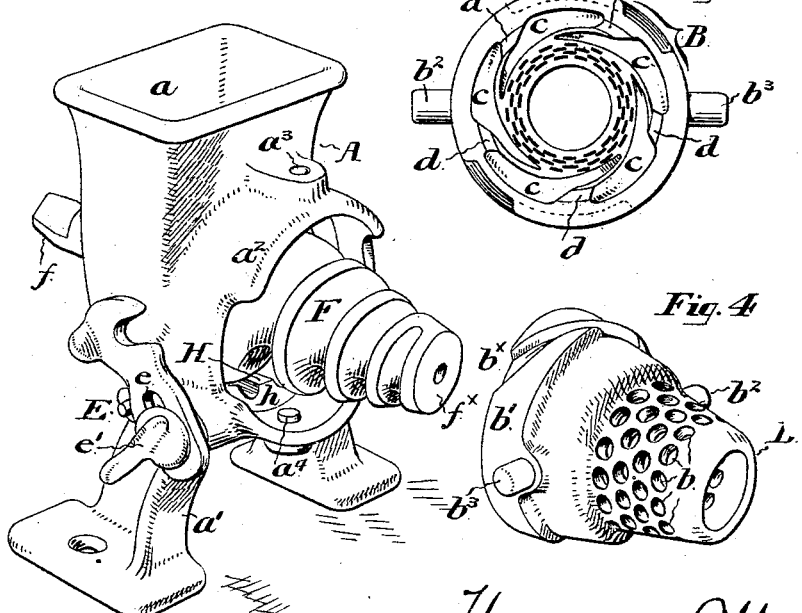
Figure 4:
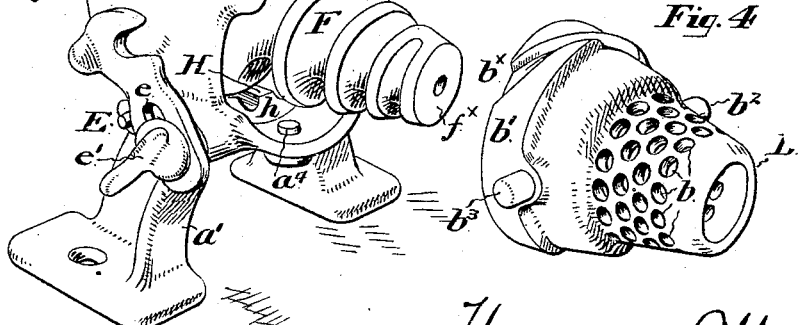

In the accompanying drawings, Figure 1 is a view in perspective of a machine conveniently embodying my invention, a portion of the hopper nearest the eye being represented as broken away to exhibit the screw, hopper rib, and screw opening or hopper outlet. Fig. 2 is a view in perspective of the machine, the conical shell being removed to exhibit the holding studs, screw, and hopper rib. Fig. 3 is an end elevational view of the conical shell, the same being removed from the machine, and sight being taken into its larger end. Fig. 4 is a view in perspective of the conical shell, as removed from the machine of Fig. 2, illustrating particularly the lugs and oblique channels of the said shell.

Similar letters of reference indicate corresponding parts.

In the drawings, A indicates the main casting of the machine, the same embodying a hopper $a$, a supporting standard $a'$, a bearing $a^\times$ for the screw shaft, and a neck $a^2$ for the reception of the cone shell.

B is a conical open-ended shell. To the extent preferably of about half its length from its outer opening inwardly, this conical shell is provided with circumscribing series of perforations or delivery holes $b$, the perforations of the respective series being preferably staggered or alternated in disposition. At the larger end of and within the shell, and extending for such remaining portion of its length as is not occupied by the perforations, there are spiral grooves $c$, which are formed by spiral projections $d$ cast within the conical shell, which grooves gradually decrease in width and depth from the larger toward the smaller end of the shell. The projections $d$ taper in one direction and are formed with abrupt cutting edges which face away from said taper, as shown in Fig. 3. The cutting edges of these projections complete the conical contour of the interior of the shell as an entirety.

To secure the conical shell to the main casting, I resort to the following arrangement. The neck $a^2$ of said casting is an annular lip surrounding the discharge opening or outlet of the hopper; this lip has top and bottom portions which have greater projection than its side portions. Within said top and bottom portions are fixedly mounted holding studs, the upper being designated $a^3$ and the lower $a^4$. The large end of the conical shell is conveniently formed with an integral exterior circumscribing rib or band $b'$ of metal, in which oblique channels or ways may be cut, and when so formed is of such external diameter as to fit snugly within the neck $a^2$.

$b^\times$ are ways or slides, being two shallow channels cut in the said rib $b'$, at diametrically opposite sides thereof, each extending from the outer edge of the shell inward in a direction oblique to the axis of said shell.

$b^2$ $b^3$ are lugs, one of which is mounted on each side of the shell at a point about midway between the channels $b^\times$.

E is a latch, the same being a hook, the shank of which is formed with a longitudinal slot $e$ through which a thumb screw $e'$ passes into its bearing in the casting A.

In applying the conical shell, the latter is placed as to its large end just within the neck $a^2$, in such position that the studs $a^3$ $a^4$ are entered in the oblique channels $b^\times$, and said shell is moved inward and slightly rotated to allow the studs to slide along the channels as it advances, until it reaches the desired position of adjustment, when the latch E is brought down upon the lug $b^2$ or $b^3$ as the case may be, and the thumb screw $e'$ is tightened, whereupon the conical shell will be firmly held in the position to which it has been adjusted. It is apparent that as the whole length of one of the oblique channels is only about one fourth or one fifth of the circumference of the shell, the rotation of the shell in its adjustment is so limited that the lug will always be within range of the latch E. It is also apparent that a very delicate adjustment of the shell with reference to the casing is possible, and that said shell will always, by the conjoint action of the two holding studs $a^3$ $a^4$, and the latch E and lug $b^2$ or $b^3$, be firmly held against rotation with the screw F. One of the two lugs $b^2$ or $b^3$ only is actually employed at a time in securing the conical shell, but two are supplied, in order that, no matter which of the two sides of the cone happens to be nearest the latch, a lug will be presented for its engagement.

The hopper wall nearest the conical shell, and which I term the front wall, is provided with a screw opening, G, termed hereinafter the hopper outlet, which is slightly larger than the interior diameter of the conical shell from crest to crest of its ribs at its large end, so as to be in effect a continuation of the conical interior of said shell, and the metal around said hopper outlet is ground to a square edge in such manner as the better to co-operate in the cutting action with the periphery of the screw, with which it is, in the operation of the screw, in shearing contact.

F indicates the screw, the outer or front end of which extends to the outer end of the conical shell, and the rear shank or extension, $f$, of which is journaled in the bearing $a^\times$ hereinbefore referred to. The spiral blade or thread of the screw extends from the rear wall of the hopper through said hopper and out to the smaller end of the conical shell. That portion of the screw which exists within the conical shell and begins at the hopper outlet G of the wall of the hopper, has one side of its thread formed with an abrupt, and its other side with a tapering, face, and its peripheral cutting edge conforms to the interior of said shell, running with a gradually diminishing pitch to the outer end of the screw where it vanishes or terminates in a circumferential conical bearing disk $f^\times$, which closes the outer opening of the shell. That portion of the screw which exists in the hopper of the machine operates in its rotation to cut up and to feed forward to within the conical shell, meat or other substances fed into the hopper, and, to more effectually accomplish this purpose and to enable it to grasp the largest masses which the hopper is capable of receiving, the thread of the screw is at this region of greater pitch than elsewhere. The screw blade terminates abruptly close to the rear wall of the hopper.

H is a rib conveniently located at the bottom of the hopper, extending conveniently in a straight direction from the rear wall of the hopper to and merging into the wall surrounding the hopper outlet. The crest of this rib is flat with square corners, and of height sufficient to place it on a level with the lower edge of said hopper outlet.

$h$ $h$ are two notches in the wall of the hopper at the margin of the hopper outlet G, one being at each side of the rib H. These notches, when the conical shell is removed, permit easy access through themselves and the hopper outlet to the sides of the rib for the removal of any matter which said rib may accumulate. In the rotation of the screw, its blade sweeps across this rib, and the rib and blade co-operate to cut the material fed to the hopper as the screw is carrying it into the conical shell. To the rear end of the screw shank is to be attached a crank or handle I of any preferred character, whereby the screw may be rotated.

Having thus described the construction of a cutter embodying my improvements, its operation will be easily understood: The meat or other substance to be cut is deposited within the hopper, and rotation is imparted to the screw. The spiral blade of the screw, which is within the hopper, in its rotation co-operates with the rib H to shear the meat and also co-operates with the edge of the hopper outlet for the same purpose; and meat fed into the hopper is thus immediately subjected to these two effective cutting instrumentalities, which thereafter continuously operate upon it. While this double shearing action is being carried on, portions of the meat are at the same time being forced forward into the conical shell, wherein it is, first, during its passage through the larger portion of the conical shell subjected to a further thorough cutting and shearing between the screw and the internal spiral cutting ribs of said conical shell, and then, secondly, during its transit through the smaller portion of the shell, subjected to a further cutting action consequent upon the sweeping of the smaller portions of the screw past the perforations in said conical shell, into which perforations the cut-up or divided pieces of meat are by the continued rotation of the screw in part forced, and through which all of the meat is, by the action of the screw, eventually discharged in small cut pieces.

It will be apparent that my machine possesses exceptionally complete arrangements for cutting up the meat, inasmuch as said meat is from the time it first comes within range of action of the screw until it is discharged through the perforations, constantly subjected to a cutting action by one or the other of the cutting appliances described.

Having thus described my invention, I claim:—

1. The combination to form the casing for a machine for cutting up meat, of a main casting, embodying a neck,—a conical shell fitted to said neck and provided with a latch stud, and a latch the shank of which is mounted upon but capable of adjustment with reference to the main casting, substantially as set forth.

2. The combination to form the casing for a machine for cutting up meat, of a main casting embodying a neck provided with studs, a conical shell fitted to said neck, embodying oblique channels in which said studs are entered, and means for locking said conical shell in desired positions of adjustment, substantially as set forth.

3. The combination, in a machine for cutting meat, of a screw, a main casting embodying a hopper a hopper outlet and a stud-provided neck,—a conical shell embodying devices which co-operate with the screw to cut up meat fed thereinto, and also embodying oblique channels which are adapted to the studs of the neck of the casting,—and an adjustable latch adapted to bind said conical shell to the main casting, substantially as set forth.

4. The combination, in a machine for cutting up meat, of a screw,—a main casting embodying a hopper a hopper outlet and a stud-provided neck,—a conical shell embodying devices which co-operate with the screw to cut up meat fed thereinto, which shell is provided with a side lug, and also embodies oblique channels which are adapted to the studs of the neck of the casting,—and a latch adapted to hook over the shell lug, and provided with a slot through which a locking screw passes to secure said latch to the main casting,—substantially as set forth.

5. The combination, in a machine for cutting up meat,—of a main casting embodying a hopper and a hopper outlet,—a conical shell embodying devices which co-operate with the screw to cut up meat fed thereinto, and which shell is adjustably secured to the casting,— and a screw extending across the bottom of the hopper and through the hopper outlet and conical shell, and which screw both feeds the meat forward from the hopper to the conical shell and at the same time cuts it up, substantially as described.

6. The combination, in a machine for cutting up meat,—of a main casting embodying a hopper a hopper outlet and a rib extending along its interior,—a conical shell embodying devices which co-operate with the screw to cut up meat fed thereto, and which shell is adjustably secured to the casting,—and a screw extending across the bottom of the hopper and through the hopper outlet and conical shell, and which screw as to the part which lies within the conical shell is conical to conform to said shell, and as to the part within the hopper is of such size that its periphery is in contact with the above mentioned rib, substantially as set forth.

7. The combination, in a machine for cutting up meat, of a main casting embodying a hopper and a hopper outlet having marginal notches,—a conical shell embodying devices which co-operate with the screw to cut up meat fed thereto, and which shell is adjustably secured to the casting,—and a screw extending across the bottom of the hopper and through the hopper outlet and conical shell, which screw as to the part which lies within the conical shell is conical to conform to said shell, and as to the part which lies within the hopper outlet is of such size that its periphery is in contact with the edge of said outlet, substantially as set forth.

8. In a meat cutter, in combination, the casting having the hopper with bottom rib and outlet, and having studded neck and adjustable latch,—the conical shell having ribs, perforations, lugs, and oblique channels,— and the screw, conical within the conical shell, and, within the hopper, making contact with the bottom rib and edge of outlet, substantially as set forth.

In testimony that I claim the foregoing as my invention, I hereunto sign my name this 29th day of April, A. D. 1890.

HERMANN ALBRECHT.

In presence of—
F. NORMAN DIXON,
LEWIS ALTMAIER.